Jan. 3, 1956

C. W. NICHOLS 2,729,570

LIGHTWEIGHT AGGREGATES AND METHOD
OF MAKING SAME FROM CLAY RESIDUES

Filed April 25, 1952

INVENTOR.
CHARLES W. NICHOLS.
BY
Ward, Crosby & Neal
ATTORNEYS.

United States Patent Office

2,729,570
Patented Jan. 3, 1956

2,729,570

LIGHTWEIGHT AGGREGATES AND METHOD OF MAKING SAME FROM CLAY RESIDUES

Charles W. Nichols, West Orange, N. J., assignor, by mesne assignments, to McDowell Company, Inc., Cleveland, Ohio, a corporation of Ohio Application April 25, 1952, Serial No. 284,381

2 Claims. (Cl. 106—40)

This invention relates to lightweight aggregates of types suitable among other possible uses, for mixing in cement mortar, to form concrete products such as building bricks and the like.

The invention particularly relates to methods for treating residues resulting from the sulfuric acid treatment of clay or bauxite to remove the alumina content and to convert it to aluminum sulfate. The method may be carried out concurrently and in conjunction with such manufacture of aluminum sulfate to provide a valuable lightweight aggregate as a by-product of such manufacture, or the method may be carried out as a separate operation utilizing the large available supplies of such residues which have heretofore accumulated or been discarded. Such residues largely comprise the silicious matter of the original clay or bauxite, together with some remaining alumina among other materials, and also a certain amount of acid left from the sulfuric acid treatment. Heretofore such residues have had no commercial value, partly because of the acid content thereof, which has precluded the use of the material for various purposes which otherwise might be possible. They contain from about 0.2 to 0.6% of sulfur in the form of sulfuric acid or soluble sulfates, and this is enough to render them unsuitable as a construction material, since the acid and sulfates will cause disintegration and staining. Such residues, furthermore, are in the form of finely divided mud, or dust if dry, and hence in a troublesome condition to handle or utilize. Thus, heretofore these residues have either been allowed to accumulate at various locations in the country as unsightly piles of waste, or have involved the expense of carrying the same away to dumping grounds.

I have found, however, that such residues may be treated to form lightweight aggregates having exceptionally desirable properties for use in forming building blocks and the like. In summary, the method of treating the material is first to disintegrate the mud or dry clay residue to insure breaking up of all lumps; then a small percentage of finely divided fuel is mixed therewith, preferably in a pelletizer mixer, with sufficient water (in the form of a fine spray) so that the mixture is formed into small pellets, nodules and fragments to provide a mass with sufficient voids so that it is readily permeable to air. The material as thus prepared is fed onto the grates of sintering machines, and then ignited and sintered. By this process the residual acid is decomposed and carried off during the sintering, and the sintered product is then crushed to the desired size for use as an aggregate for the manufacture of concrete products.

The resulting aggregate product is quite free of any objectionable acid or sulfur content and thus has no tendency to cause disintegration or staining of the concrete products in which it is used. The product also has a very substantially lower content of ferric oxide or of iron in any other form, than is the case with aggregates heretofore formed directly from natural clays, with the result that the product made according to this invention is of a fairly light gray color, highly desirable for producing attractive concrete products. The product forms into irregular and highly cellular or porous rigid strong pieces which do not readily crumble, but such small proportions as may tend to crumble, will be in the form of hard, light, gray, non-dusty grains, free of dirt-like material. On the other hand, aggregates formed directly by sintering the usual natural clays are nearly black, because of the iron content and are more powdery, dusty and dirty.

Other objects, features and advantages of the invention will appear from the more detailed description given below, taken in connection with the accompanying drawing which forms a part of this specification.

As indicated by the flow sheet, raw natural clays or bauxite to be processed for the recovery of aluminum sulfate according to well-known procedure, are first treated in a digester with sulfuric acid and steam, leached with hot water, filtered, and then the resulting solution is treated with suitable reagents for the removal of iron salts, then filtered to remove impurities, the aluminum sulfate then being formed as crystals from the resulting solution. Since by this procedure the greater part of the iron content of the clay is contained in the solution resulting from the initial digesting, leaching and filtering treatment, the clay residue or filter cake will be largely free at the outset from ferric oxide or iron content in other forms. Natural clays, for example of the kaolinite type, contain from about 2 to 3.6% of ferric oxide, whereas the filter cake resulting from the above-mentioned digesting, leaching and filtering treatment, will generally contain less than 1% of ferric oxide. Such clay residues or filter cake generally will have compositions, the principal ingredients of which are present in amounts within about the following limits:

| | Percent |
|---|---|
| $SiO_2$ | 70–76 |
| $Al_2O_3$ | 8–10.5 |
| $Fe_2O_3$ | 0.5–1.5 |
| $TiO_2$ | 3–3.5 |
| CaO | Traces |
| MgO | 1–1.5 |
| Potassium and sodium oxides | 1–3 |
| S | 0.2–0.4 |

Such residues also contain about 8–10% of material which will be burned away upon thorough roasting of same.

Figure 1:
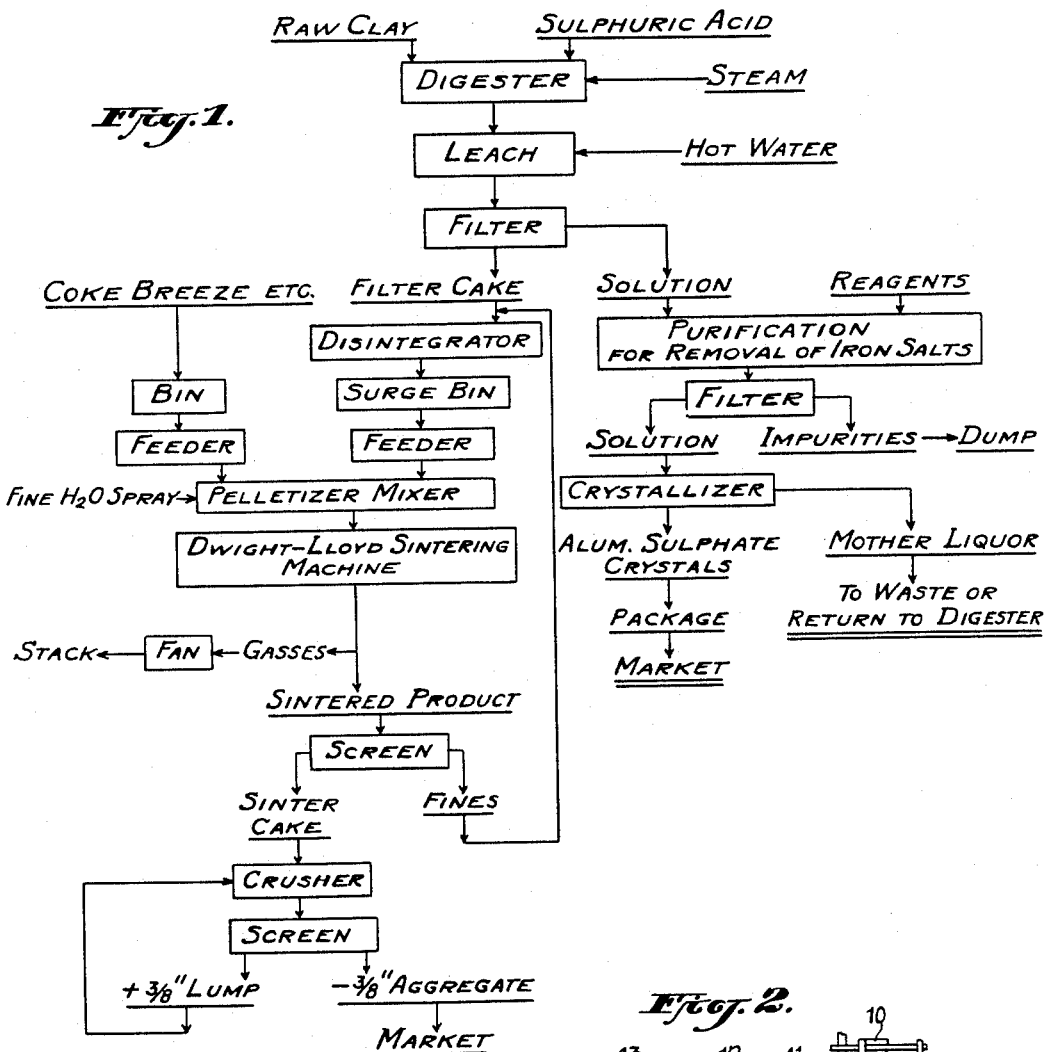
Fig. 1 is a flow sheet indicating the process for forming the novel lightweight aggregates from the clay residues, this figure also comprising in part a simplified flow sheet for the process of treating the raw clay to obtain aluminum sulfate and at the same time the residue, from which the improved aggregate is formed.

As shown by the lefthand portion of the oflw sheet of Fig. 1, such residues or filter cake, according to the process of the invention, are first put through a suitable disintegrator to crush or break up all lumps. The material should be crushed to a size such that it will all pass a screen with one-half inch openings, and such that much of it, for example 80%, will pass a screen with one-quarter inch openings. The disintegrated material, after passing through a surge or storage bin, is then preferably passed into a pelletizer type mixer, into which finely divided fuel from a bin is also fed, and while a fine water spray is also applied to the mixture. The fuel used may be coke breeze, fine coal, charcoal, sawdust or other suitable solid fuel, preferably in amounts constituting about 6–8% of the mixture in the mixer. Sufficient water is added in the mixer by the use of the fine spray so that the charge is formed partly into small pellets or nodules (pinhead to pea size) and partly into irregularly shaped fragments of approximately the same size range. The moisture added may vary from about 10–20%. It is important that the prepared charge or mixture, as it leaves the pelletizer mixer, contain sufficient voids so that it is readily permeable to air.

Figure 2:
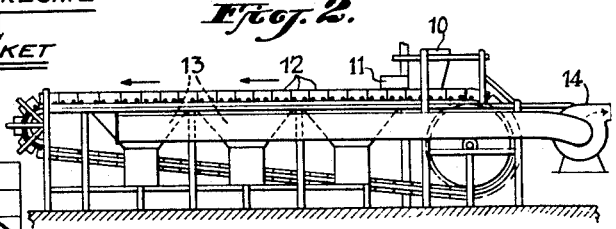
Fig. 2 is a somewhat schematic side elevational view of a typical sintering machine which may be used in carrying out the invention.

The mass of pellets and fragments is now fed onto a sintering machine which may be of a suitable well-known type, such as of the Dwight-Lloyd type somewhat schematically indicated in Fig. 2, and having a feed hopper at 10, a burner at 11 and a continuous series of movable pallets as at 12, through the material on which air is drawn down into wind box means as at 13 by a suction blower 14.

In carrying out and controlling the sintering operation, the following conditions should be observed. First the amount of fuel added to the mixture should be sufficient to supply heat to raise the temperature of the material only momentarily to its fusion point. Insufficient fuel results in a weaker sinter or no sintering at all, whereas an excess of fuel causes a heavily fused, denser product, and also retards the sintering operation. As above indicated, the charge on the sintering machine preferably contains about 8–10% of finely divided coal or coke in typical cases.

Next; care should be taken that sufficient air is drawn through the charge on the sintering machine to burn the fuel rapidly. Insufficient air will result in slow sintering and require an excess of fuel to give adequate heat at the slower burning rate, and an excess of air tends to draw any fine particles of the charge into the wind box. The rate of application of air to the charge may, of course, be controlled by the speed of the suction blower, by dampers or by varying the depth of the charge on the bed of the machine. With the clay residues here under consideration, a bed thereof on the sintering machine about 8 inches in depth has been found suitable, and through each square foot of this bed, from 50 to 150 cubic feet of air per minute is drawn, the most desirable rate being readily determined by trial.

Figure 3:
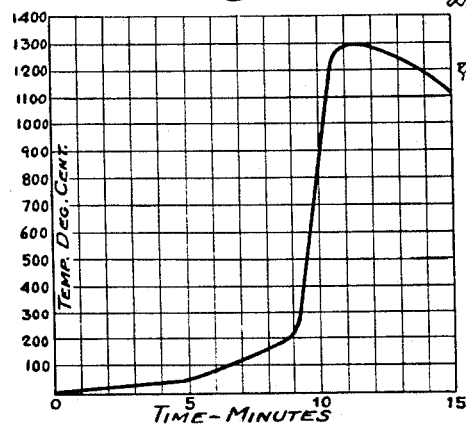
Fig. 3 is a time-temperature curve indicating the preferred heating cycle to which the residues are subjected in sintering same according to the invention.

The sintering action starts at the top of the bed as the charge passes under the burner, where combustion of the fuel begins. The reaction zone progresses downwardly in the bed toward the grates, and the speed of movement of the pallets is regulated so that when the action is complete through the depth of the bed on a given pallet, that pallet will have about reached the end of the sintering machine and will be ready for discharge. At any given point in the bed, the reaction temperature lasts only for a short period—from 15 seconds to one minute, as indicated by the uppermost portion of the time-temperature curve shown in Fig. 3, this curve indicating, for a typical example, the rate at which the temperature changes at a given point in the bed of material being sintered. Toward the end of the machine, the air passing down through the bed cools the particles which are then in cellular form and thus the cellular or highly porous structure is preserved. Since all parts of the bed will be subjected to the sintering temperature, the residual acid is decomposed and carried off in the airstream.

As further indicated by the flow sheet, the sintered product may be screened and the fines returned to the disintegrator, whereas the sinter cake is passed through a crusher and again screened. Lumps in excess of about a three-eighths inch size may be again passed through the crusher, whereas the particles and lumps smaller than that size, constitute the lightweight aggregate ready for market.

In a typical case, the resulting aggregate had approximately the following composition:

| | Percent |
|---|---|
| $SiO_2$ | 77.9 |
| $Al_2O_3$ | 16.5 |
| $Fe_2O_3$ | 0.74 |
| CaO | 0.46 |
| MgO | Trace |
| KNaO | 0.36 |
| S | 0.05 |
| Remaining materials which can be ignited and burned off by roasting | 3.60 |

In typical cases the percentages of $SiO_2$ and $Al_2O_3$ may vary by about 5% from the percentages above given.

In other cases the resulting aggregates may have compositions within the following limits:

| | Percent |
|---|---|
| $SiO_2$ | 70 –85 |
| $Al_2O_3$ | 6 –17 |
| $Fe_2O_3$ | 1.5– 0.5 |
| CaO | 1.0–zero |
| MgO | 0.7–zero |
| KNaO | 1.4–zero |
| S | 3.5–zero |
| Ignition loss | 15 – 3.5 |

For forming concrete products, a typical batch of mortar made by using the resulting aggregate product may have the following composition:

| | |
|---|---|
| Portland cement | 575 lbs. |
| Air entraining agent | About 1.44 lbs. |
| Lightweight aggregate | 1830 lbs. |
| Water (gallons) | 33.5. |

This mix will have a slump of two inches, and the resulting batch will be sufficient to produce about 27 cubic feet of concrete weighing (moist cured) about 100.6 lbs. per cubic foot. The compressive strength of the resulting concrete, determined by testing cylinders thereof twelve inches high and six inches in diameter, was, after seven days, 1079 lbs. per square inch, and after 28 days, 1980 lbs. per square inch. The lightweight aggregate product comes well within the established A. S. T. M. requirements for lightweight aggregates to be used in forming concrete products. A typical example has a specific gravity in bulk (saturated, surface dry) of 1.76 and a weight (dry, jigged) of 69.7 lbs. per cubic foot. The light gray color of the aggregate is highly desirable from the marketing standpoint, since light-colored concrete blocks are generally preferred.

What is claimed and desired to be secured by Letters Patent is:

1. Method for forming a lightweight aggregate for use in concrete products, from clay rich in silicon dioxide, aluminum oxide and containing substantial amounts of oxidized iron and which has been digested with sulfuric acid and leached to remove aluminum sulfate and a substantial portion of the iron content as salts thereof, said method comprising: mixing the thus-treated clay in disintegrated form with fine fuel and forming the mixture into pellets; igniting the fuel in a layer of the pellets and passing air therethrough, sufficient fuel being used for the mixture to cause only momentary sintering of the pellets to form a rigid cellular sinter cake; and then cooling and crushing such cake to provide the lightweight aggregate of desired size.

2. A lightweight highly cellular aggregate of gray color adapted for use in forming concrete products and made according to the method specified in claim 1.

References Cited in the file of this patent
UNITED STATES PATENTS

| | | |
|---|---|---|
| 1,255,878 | Hayde | Feb. 12, 1918 |
| 1,538,837 | Moxham | May 19, 1925 |
| 1,747,551 | Kraus | Feb. 18, 1930 |
| 1,895,159 | Greenawalt | Jan. 24, 1933 |
| 1,945,172 | Wilson | Jan. 30, 1934 |
| 2,077,347 | Grossinger | Apr. 13, 1937 |
| 2,555,289 | Nagel | May 29, 1951 |